W. COX & A. SHUMAN.
CORRUGATED WIRE GLASS.
APPLICATION FILED APR. 18, 1911.

1,156,214.   Patented Oct. 12, 1915.

WITNESSES:

INVENTORS
Walter Cox and
Arno Shuman.
BY
Augustus B Stoughton
ATTORNEY.

UNITED STATES PATENT OFFICE.

WALTER COX AND ARNO SHUMAN, OF PHILADELPHIA, PENNSYLVANIA, ASSIGNORS TO PENNSYLVANIA WIRE GLASS MANUFACTURING COMPANY, OF PHILADELPHIA, PENNSYLVANIA, A CORPORATION OF NEW JERSEY.

CORRUGATED WIRE-GLASS.

1,156,214. Specification of Letters Patent. Patented Oct. 12, 1915.

Application filed April 18, 1911. Serial No. 621,752.

*To all whom it may concern:*

Be it known that we, WALTER COX and ARNO SHUMAN, both citizens of the United States, and residents of Philadelphia, in the county of Philadelphia and State of Pennsylvania, have jointly invented certain new and useful Improvements in Corrugated Wire - Glass, of which the following is a specification.

The principal object of the present invention is to provide corrugated wire glass.

In the accompanying drawings there is illustrated, more or less, diagrammatically a machine and process and also the article, and in those drawings—

Figure 1:
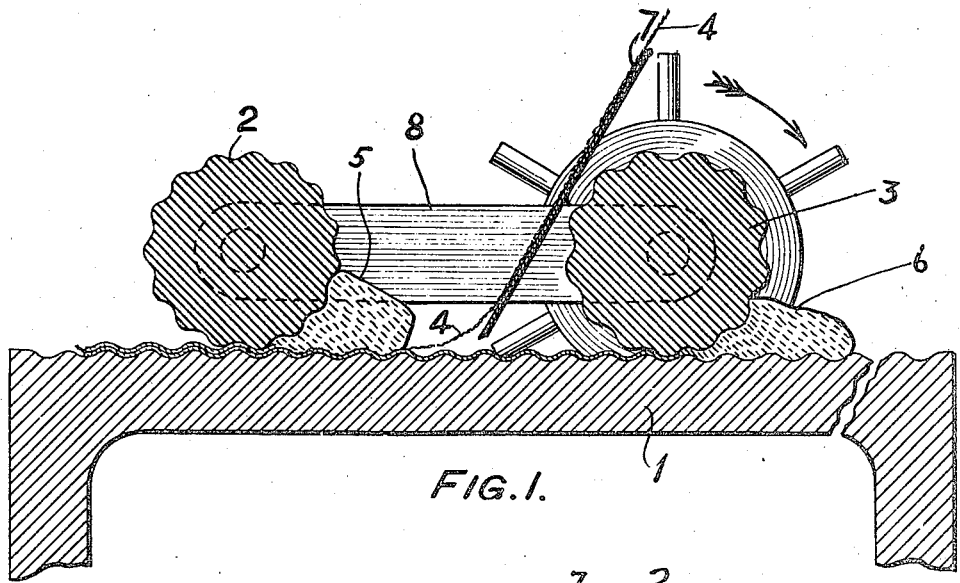
Figure 2:
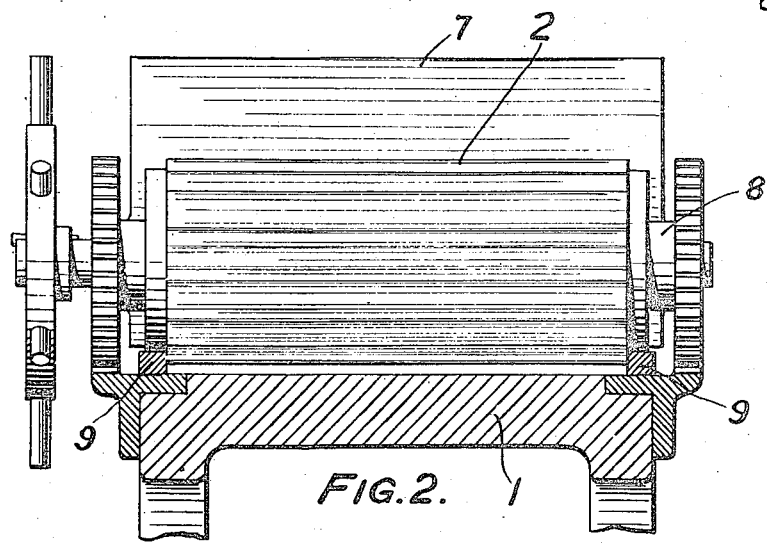

Figure 1, is a longitudinal section of one type of machine. Fig. 2, a transverse section of the machine of Fig. 1, and Fig. 3, a perspective view of a piece of corrugated wire glass.

Figure 3:
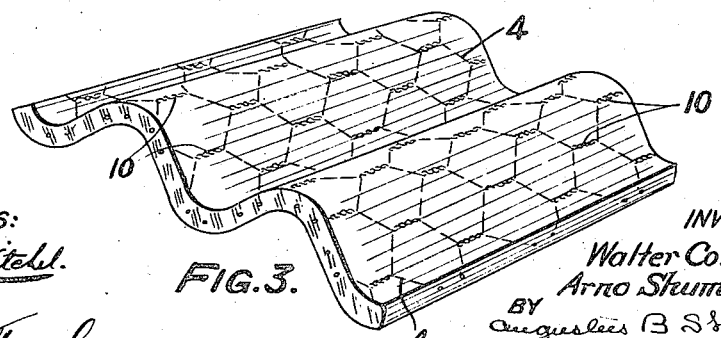

In Fig. 3, is illustrated the sheet of wire glass corrugated alike on both faces and of practically the same thickness at all points of the corrugations and having a wire mesh inclosed between the surfaces of the sheet. Each surface presents a continuous curve and repeatedly crosses the median plane of the sheet and the distance from center to center of the corrugations is at least three times the thickness of the glass. Evidently the sheet is possessed of great mechanical strength. The distance from center to center of the corrugations is considerable, and may be measured by saying that it is at least three times the thickness of the glass, because the glass is most advantageously employed in conjunction with corrugated sheet iron of which the corrugations are generally spaced at least three times as wide apart as the thickness of the ordinary sky - light glass. The fact that the surfaces of the corrugations cross the median plane of the sheet is a characteristic of the article.

One way of making the product is described in our application, Serial No. 621,751, filed April 18th, 1911. Another way of making the product will now be described.

The table 1 is transversely corrugated and the rollers 2 and 3 are axially corrugated. In operation each roller rolls a part of the sheet and between the two parts of the sheet the wire netting or mesh 4, is incorporated. 5 and 6 are lumps or pours of glass, one in advance of each roller and they are rolled by the rollers into the sheet, as described. The mesh 4 may be introduced between the rolls, as shown or in front of the leading roller, all of which is well understood.

7, is a chute that may be employed for guiding the wire and the chute and rolls may be connected by a carriage 8. If desired the trangs 9 may be removed so as to get the finished sheet off the table sidewise, that is, in the direction of the corrugations. The rolls and table by reason of their form, corrugate the sheet of glass and the wire mesh is also corrugated as it is incorporated into the glass. In the wire mesh the respective wires are twisted together as at 10, and this line of twist operates as a kind of hinge or articulation about which the netting may be comparatively easily bent. The line of twist lies in the direction of the corrugations and in this way the incorporation and corrugation of the netting as the sheet of glass is rolled and corrugated is facilitated.

What we claim is:

1. A corrugated sheet of glass in which each surface presents a continuous curve and repeatedly crosses the median plane of the sheet and having inclosed in it a corrugated sheet of wire netting.

2. A sheet of wire glass corrugated alike on both faces and of practically the same thickness at all points of the corrugations and having a wire mesh inclosed between the surfaces of the sheet and in which the distance from center to center of the corrugations is at least three times the thickness of the glass.

In testimony whereof we have hereunto signed our names in the presence of

WALTER COX.
ARNO SHUMAN.

Witnesses:
CLIFFORD K. CASSEL,
FRANK E. FRENCH.